United States Patent
Stewart

(10) Patent No.: US 7,426,860 B2
(45) Date of Patent: Sep. 23, 2008

(54) RING RESONATOR GYRO WITH FOLDED CYLINDER SUSPENSION

(75) Inventor: Robert E. Stewart, Woodland Hills, CA (US)

(73) Assignee: Litton Systems Inc., Woodland Hills, CA (US)

( * ) Notice: Subject to any disclaimer, the term of this patent is extended or adjusted under 35 U.S.C. 154(b) by 0 days.

(21) Appl. No.: 11/499,959

(22) Filed: Aug. 7, 2006

(65) Prior Publication Data

US 2007/0034006 A1    Feb. 15, 2007

(51) Int. Cl.
*G01C 19/56* (2006.01)
*G01P 9/04* (2006.01)

(52) U.S. Cl. .................................................. 73/504.13

(58) Field of Classification Search ............... 73/504.04, 73/504.12, 504.13, 504.02, 504.14, 504.15
See application file for complete search history.

(56) References Cited

U.S. PATENT DOCUMENTS

| | | | | |
|---|---|---|---|---|
| 5,915,276 A * | 6/1999 | Fell | ............................ | 73/504.13 |
| 6,089,090 A * | 7/2000 | Namerikawa et al. | ..... | 73/504.13 |
| 6,128,954 A * | 10/2000 | Jiang | ........................ | 73/504.13 |
| 6,897,538 B2 * | 5/2005 | Eskridge | ...................... | 257/415 |
| 6,934,660 B2 * | 8/2005 | Painter et al. | ................ | 702/141 |

* cited by examiner

*Primary Examiner*—Helen C. Kwok
(74) *Attorney, Agent, or Firm*—Patti, Hewitt & Arezina LLC

(57) ABSTRACT

A ring resonator gyro comprises a folded cylinder suspension that supports a cylindrical ring resonator. The folded cylinder suspension comprises an inner cylinder, an outer cylinder, and an annulus. The inner cylinder, the outer cylinder, and the annulus are concentric. A top edge of the inner cylinder is coupled with an inner edge of the annulus. A top edge of the outer cylinder is coupled with an outer edge of the annulus.

10 Claims, 2 Drawing Sheets

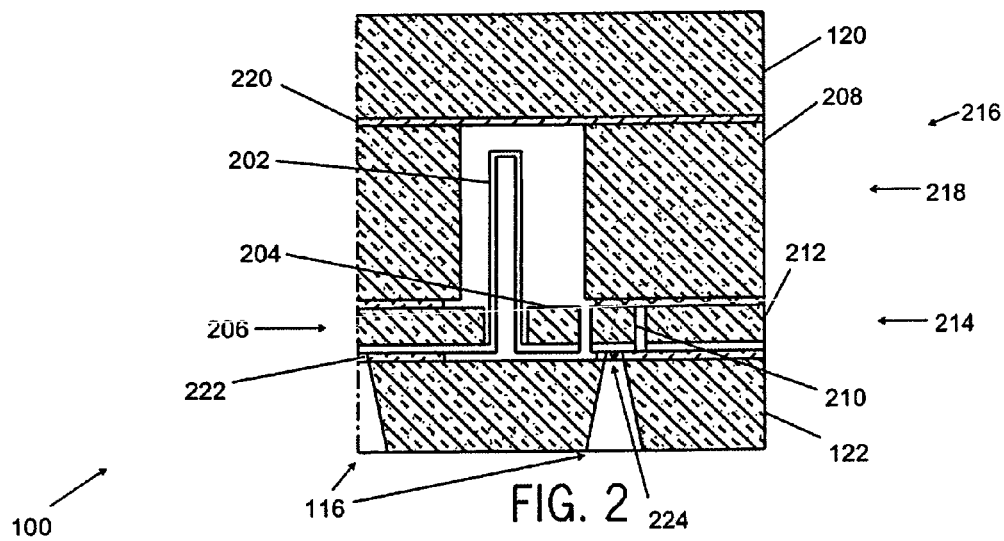
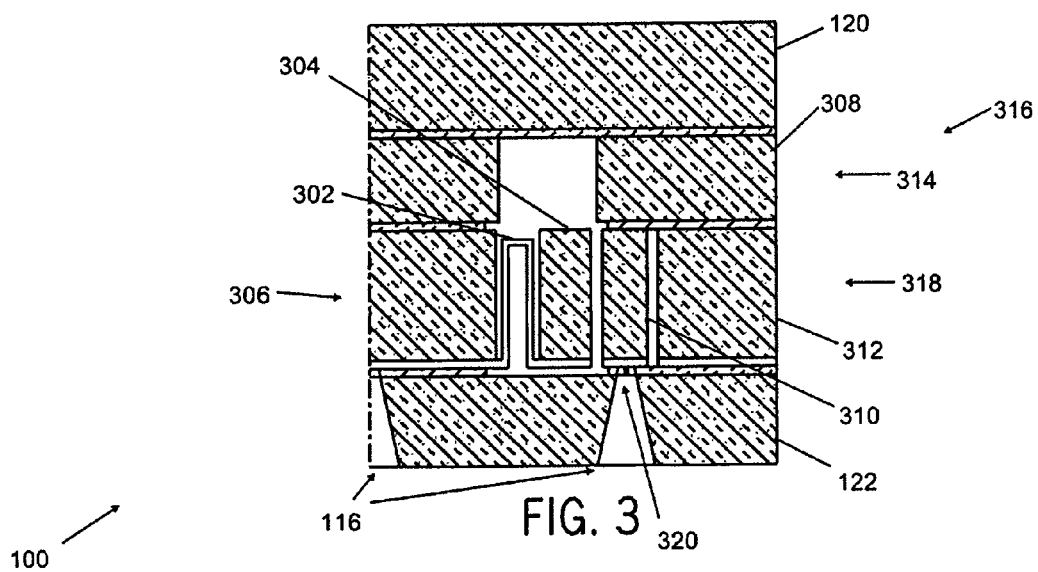

RING RESONATOR GYRO WITH FOLDED CYLINDER SUSPENSION

CROSS-REFERENCE TO RELATED APPLICATIONS

This application contains subject matter that is related to the subject matter of the following applications, which are assigned to the same assignee as this application. The below-listed applications are hereby incorporated herein by reference in their entities:

"OSCILLATION OF VIBRATING BEAM IN A FIRST DIRECTION FOR A FIRST TIME PERIOD AND A SECOND DIRECTION FOR A SECOND TIME PERIOD TO SENSE ANGULAR RATE OF THE VIBRATING BEAM," by Stewart, application Ser. No. 60/549,709, filed Mar. 3, 2004.

"REAL TIME BIAS ESTIMATOR," by Lee, application Ser. No. 11/364,316, filed Feb. 28, 2006.

"COPLANAR PROOFMASSES EMPLOYABLE TO SENSE ACCELERATION ALONG THREE AXES," by Stewart, application Ser. No. 11/010,588, filed Dec. 13, 2004.

"RING RESONATOR GYROSCOPE WITH CYLINDRICAL RING SUSPENSION," by Stewart, application Ser. No. 11/500,044, co-filed herewith.

BACKGROUND

An electromechanical system in one example measures a parameter. The electromechanical system may comprise a micro-electromechanical system ("MEMS") accelerometer or gyroscope that measures the parameter. For example, the accelerometer measures an acceleration and the gyroscope measures an angular rate (e.g., rotation). The gyroscope in one example comprises a vibrating ring with high Q degenerate fundamental modes of vibration. For example, high Q vibrating rings require little energy to sustain vibration. The vibrating ring in one example is employable for high performance closed loop angular rate sensing. The vibrating ring in another example is employable for lower performance open loop angular rate sensing. The mathematical model of the symmetrical vibrating ring is in many aspects similar to a vibrating ring or hemispherical resonator gyroscope ("HRG"). The analytical similarity to the hemispherical resonator gyroscope indicates that the vibrating ring gyroscope has the potential of achieving similar performance.

Drive components coupled with the vibrating ring cause a first oscillation of the vibrating ring. An angular rate of the vibrating ring and the first oscillation induce a Coriolis force on the vibrating ring. For example, the angular rate is about the longitudinal axis of the vibrating ring. The Coriolis force causes a second oscillation of the vibrating ring. The second oscillation is substantially perpendicular to the first oscillation. Feedback components in one example provide feedback on a magnitude of the first oscillation to the drive components for regulation of the first oscillation. Pickoff sensor components sense the second oscillations and apply control signals to null the pickoff signal. The control signals are a measure of the magnitude and polarity of the angular rate of the vibrating ring.

Small, low cost, low power navigation-grade inertial systems are needed to enable new applications such as personal navigation of individual soldiers and the guidance and control of air, ground and under water autonomous vehicles in GPS denied environments. Micro-electromechanical systems inertial systems are currently in development that promise to provide small, low cost, low power inertial systems for tactical grade applications such as guided munitions. Current tactical-grade MEMS inertial systems have gyro bias uncertainty in the range of 20-50 degrees per hour and angle random walk of 0.02 degrees per root hour. Future, small, low cost, low power navigation-grade inertial systems require lower gyro bias uncertainty and angle random walk.

Currently, a manufacturer of inertial sensors performs calibration of the inertial sensors with thermal modeling at a system level. The inertial system performance may be limited by one or more of: instability of the inertial sensors' bias and scale factor, non-repeatability of the thermal model, or hysteretic and thermal gradient induced errors that can not be modeled.

SUMMARY

The invention in one implementation encompasses a ring resonator gyro. The ring resonator gyro comprises a folded cylinder suspension that supports a cylindrical ring resonator. The folded cylinder suspension comprises an inner cylinder, an outer cylinder, and an annulus. The inner cylinder, the outer cylinder, and the annulus are concentric. A top edge of the inner cylinder is coupled with an inner edge of the annulus. A top edge of the outer cylinder is coupled with an outer edge of the annulus.

Another implementation of the invention encompasses a method. A first circular cavity is patterned and etched through a device layer of an SOI wafer and into a handle layer of the SOI wafer to a depth that is less than a thickness of the handle layer. A sacrificial layer is deposited or grown on the SOI wafer and in the first circular cavity. The sacrificial layer is removed from a surface of the device layer. A layer of epi-poly silicon is deposited on the SOI wafer and in the first circular cavity. A portion of the layer of epi-poly silicon comprises a folded cylinder suspension. A ring resonator is patterned and etched through the layer of epi-poly silicon and device layer down to a first insulator layer of the SOI wafer. A second circular cavity is patterned and etched through the handle layer to the first insulator layer of the SOI wafer. The first circular cavity and the second circular cavity are concentric. The sacrificial layer is etched surrounding the folded cylinder suspension and first insulator layer of the SOI wafer to release the ring resonator, the folded cylinder suspension, and a center mount.

A further implementation of the invention encompasses a method. A first circular cavity is patterned and etched through a handle layer to a first insulator layer of an SOI wafer. A sacrificial layer is deposited or grown on the SOI wafer and in the first circular cavity. The sacrificial layer is removed from a surface of the handle layer. A layer of epi-poly silicon is deposited on the SOI wafer and in the first circular cavity. A portion of the epi-poly silicon comprises a folded cylinder suspension. A ring resonator is patterned and etched through the layer of epi-poly silicon and handle layer down to the first insulator layer of the SOI wafer. A plurality of windows are patterned and etched through the device layer to the first insulator layer of the SOI wafer. The plurality of windows are concentric with the first circular cavity. The plurality of windows expose the sacrificial layer around the folded cylinder suspension and the first insulator layer of the SOI wafer. The sacrificial layer is etched around the folded cylinder suspension and the first insulator layer of the SOI wafer to release the ring resonator, the folded cylinder suspension, and a center mount.

DESCRIPTION OF THE DRAWINGS

Features of example implementations of the invention will become apparent from the description, the claims, and the accompanying drawings in which:

FIG. 2 is a representation of a partial, cross-sectional side view of one implementation of the ring resonator gyro of FIG. 1.

FIG. 3 is a representation of a partial, cross-sectional side view of another implementation of the ring resonator gyro of FIG. 1.

DETAILED DESCRIPTION

Figure 1:
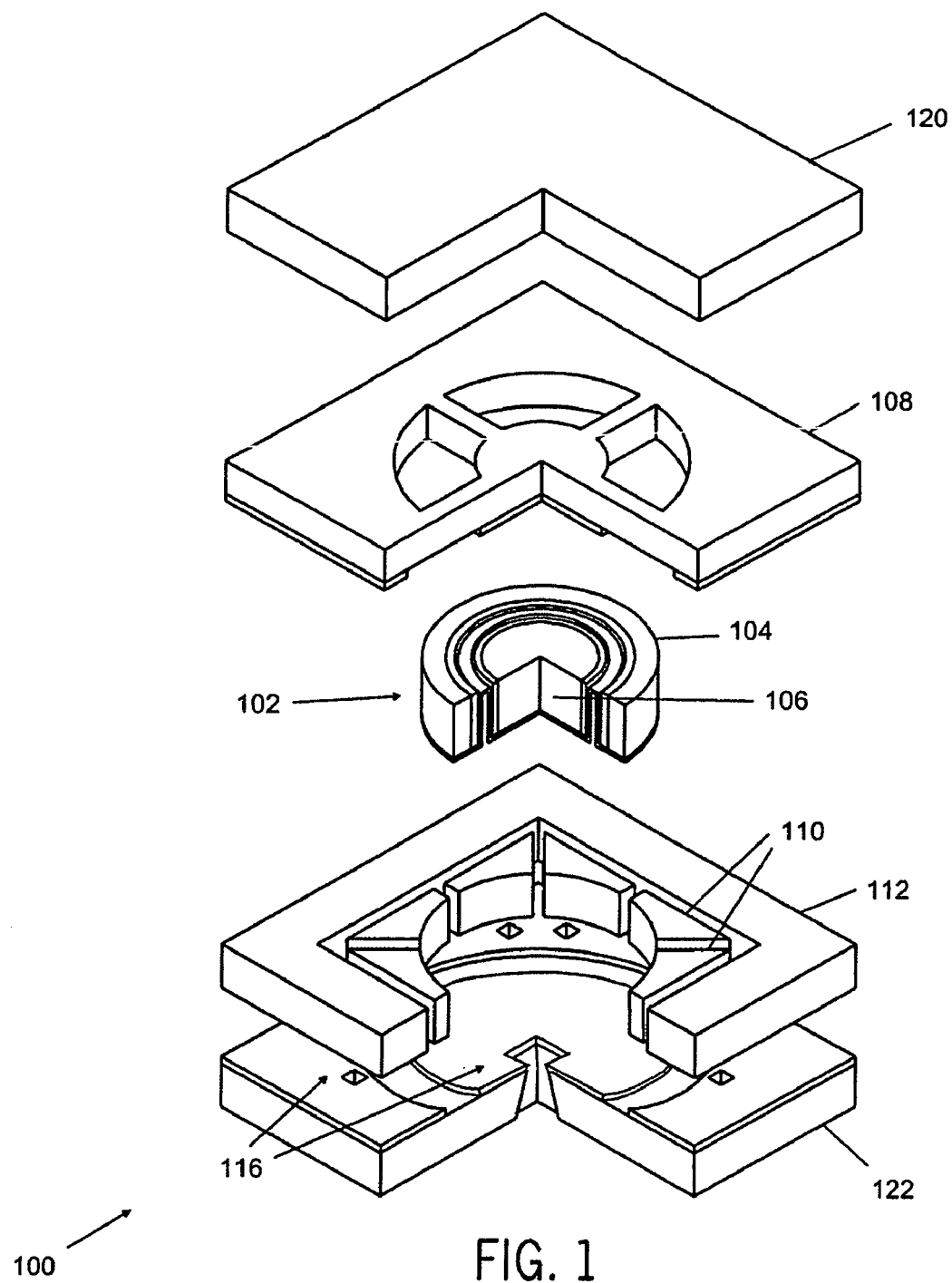
FIG. 1 is a representation of an exploded, perspective view of one implementation of an apparatus that comprises a ring resonator gyro with folded cylinder suspension.

A navigation-grade inertial system in one example comprises relatively lower performance gyroscopes configured in a "self-calibrating" inertial system. In a further example, the inertial system is configured such that all of the inertial sensors lie in a single plane. This configuration does not require a sensor mounting block to orient the sensors to form an orthogonal three axis coordinate frame and does not require out-of-plane interconnections.

The self-calibration of the sensors in one example allows for an increase in accuracy of navigation grade inertial sensors by an order of magnitude without the use of a global positioning system (GPS). In a further example, the self-calibration of the sensors reduces gyro bias performance requirements of the sensors by two orders of magnitude for miniature, low power, low cost navigation-grade inertial systems.

To maintain the "self-calibrating" feature, a Z axis gyro in one example is a Class II Coriolis vibratory gyro, such as a vibrating ring gyro. The hemispheric resonator gyro (HRG) is an example of this class of gyro. Current HRGs, while demonstrating navigation-grade performance, do not satisfy the low cost requirement.

A low cost MEMS equivalent of the hemispheric resonator gyro (HRG) in one example may be operated in a self-calibrating mode and when integrated with a planar accelerometer and vibrating ring gyro in one example will form a very low cost, low power navigation-grade inertial system.

A cylinder suspension of a ring resonator gyro in one example has a non-linear spring stiffness for in-plane deflections of the ring. The in-plane stiffness of the suspension increases with the deflection of the ring which puts the fibers of the suspension in tension at the antinodes of the ring's vibration pattern. In the case of the cylinder suspension, electrical contact to the ring is made through the top cover which in one example employs a lead to be connected to the top of the gyro chip while the remaining electrical contacts to the drive/sense electrodes are made through the bottom cover. By making all of the electrical contacts through the bottom cover the gyro can directly interface both electrically and mechanically with the surface to which it mounts without additional wire bonds or leads.

FIG. 1 is a cutaway exploded view of one implementation of a ring resonator gyro 100 with folded cylinder suspension 102 (202 and 302). FIGS. 2 and 3 are partial cross sections of the gyro showing two example configurations of the ring resonator 104 (204 and 304), ring resonator center mount 106 (206 and 306), spacer 108 (208 and 308), drive/sense electrodes 110 (210 and 310) and sealing ring 112 (212 and 312). In FIG. 2 the ring resonator 204, ring resonator center mount 206, drive/sense electrodes 210 and sealing ring 212 are formed in the device layer 214 of an SOI wafer 216. The spacer 208 is formed in a handle layer 218 of the SOI wafer 216. The folded cylinder suspension 202 is formed by deposition of a material such as epi-poly silicon in a cavity formed in both the device and handle layers 214 and 218, respectively, of the SOI wafer 216. The cavity is lined with a sacrificial layer such as a silicon dioxide which is subsequently removed to release the ring resonator 204 and folded cylinder suspension 202. In this configuration the sacrificial layer and the epi-poly silicon deposition must uniformly bridge the interface between the device and handle layers 214 and 218 of the SOI wafer 216. In FIG. 3 the ring resonator 304, ring resonator center mount 306, drive/sense electrodes 310 and sealing ring 312 are formed in the handle layer 318 of an SOI wafer 316. The spacer 308 is formed in the device layer 314. This configuration allows the ring resonator 304 to have a higher aspect ratio providing more mass for a given resonant frequency and increased out-of-plane stiffness.

The folded cylinder suspension 102 substantially reduces the non-linear spring stiffening effect associated with the single cylinder suspension in much the same manner that the folded beam suspension substantially reduces the same effect in current MEMS gyros. Since both ends of the beam or cylinder originate from a common line or plane the center of the folded beam or cylinder is free to accommodate the lateral in plane motion without introducing tension in the beam or cylinder. An additional feature of the folded cylinder suspension is the increased compliance of the suspension for a given SOI thickness.

The electronics to operate the ring resonator gyro 100 in one example are identical to that used to operate a hemispheric resonator gyro except for the changes necessary to accommodate the difference in resonant frequency and pick-off and forcer scaling.

The following fabrication sequence describes example steps to fabricate a single ring resonator sensor chip of the configuration shown in FIG. 2. Multiple chips in one example will be fabricated on a single silicon wafer. The number of chips will depend on the wafer diameter.

1. Using deep reaction ion etching such as the Bosch process, pattern and etch a circular cavity through the device layer 214 of the SOI wafer 216 and into the handle layer 218 to a depth that is less than the thickness of the handle layer 218. The width of the circular cavity is determined by the wall thicknesses of the sacrificial layers and the folded cylinder suspension design.
2. Deposit or grow a sacrificial layer such as silicon dioxide on the SOI wafer and in the circular cavity.
3. Remove the sacrificial layer from the surface of the device layer and deposit epi-poly silicon on the SOI wafer 216 and in the circular cavity.
4. Pattern and etch the ring resonator 204 and drive/sense electrode patterns through the epi-poly silicon and device layer 214 down to the insulator of the SOI wafer 216.
5. Pattern and etch a circular cavity through the handle layer 218 to the insulator layer of the SOI wafer 216. The cavity is concentric with the cavity etched from the device side and exposes the sacrificial layer surrounding the epi-poly silicon folded cylinder suspension and the insulator layer of the SOI wafer 216.
6. Etch the sacrificial layer surrounding the folded cylinder suspension 202 and insulator layer of the SOI wafer 216 to release the ring resonator 204 and suspension 202.
7. Deposit or grow a dielectric insulator layer 220 and 222 on both the top and bottom cover wafers 120 and 122.

8. Bond the bottom wafer to the device layer of the SOI wafer and bond the top cover 120 to the handle layer 218 of the SOI wafer 216.

9. Form vias 116 in the bottom cover 122 to make electrical contact with the drive/sense electrodes 210 and the ring resonator center mount 206, for example, with an ohmic contact 224.

The following fabrication sequence describes example steps to fabricate a single ring resonator sensor chip of the configuration shown in FIG. 3. Multiple chips in one example will be fabricated on a single silicon wafer. The number of chips will depend on the wafer diameter.

1. Using deep reaction ion etching such as the Bosch process, pattern and etch a circular cavity through the handle layer 318 to the insulator layer of the SOI wafer 316. The width of the circular cavity is determined by the wall thicknesses of the sacrificial layers and the folded cylinder suspension design.

2. Deposit or grow a sacrificial layer such as silicon dioxide on the SOI wafer 316 and in the circular cavity.

3. Remove the sacrificial layer from the surface of the handle layer 318 and deposit epi-poly silicon on the SOI wafer 316 and in the circular cavity.

4. Pattern and etch the ring resonator 304 and drive/sense electrode patterns 310 through the epi-poly silicon and handle layer 318 down to the insulator of the SOI wafer 316.

5. Pattern and etch multiple windows through the device layer 314 to the insulator layer of the SOI wafer 316. The windows are concentric with the cavity etched from the handle side and expose the sacrificial layer surrounding the epi-poly silicon folded cylinder suspension 302 and the insulator layer of the SOI wafer 316.

6. Etch the sacrificial layer surrounding the folded cylinder suspension 302 and insulator layer of the SOI wafer 316 to release the ring resonator 304 and suspension 302.

7. Deposit or grow a dielectric insulator layer on both the top and bottom cover wafers 120 and 122.

8. Bond the bottom wafer to the handle layer 318 of the SOI wafer 316 and bond the top cover to the device layer 314 of the SOI wafer 316

9. Form vias 116 in the bottom cover 122 to make electrical contact with the drive/sense electrodes 310 and the ring resonator center mount 306, for example, through an ohmic contact 320.

What is claimed is:

1. A ring resonator gyro, comprising:
a folded cylinder suspension that supports a cylindrical ring resonator;
wherein the folded cylinder suspension comprises an inner cylinder, an outer cylinder, and an annulus;
wherein the inner cylinder, the outer cylinder, and the annulus are concentric;
wherein a top edge of the inner cylinder is coupled with an inner edge of the annulus;
wherein a top edge of the outer cylinder is coupled with an outer edge of the annulus.

2. The ring resonator gyro of claim 1, wherein the inner cylinder and the outer cylinder comprise a substantially same height.

3. The ring resonator gyro of claim 1, wherein the folded cylinder suspension accommodates lateral in plane motion of the cylindrical ring resonator.

4. The ring resonator gyro of claim 1, wherein the cylindrical ring resonator is coupled with a bottom edge of the outer cylinder.

5. The ring resonator gyro of claim 4, further comprising:
a center mount;
wherein a bottom edge of the inner cylinder is coupled with the center mount.

6. The ring resonator gyro of claim 5, further comprising:
a spacer, a plurality of drive and/or sense electrodes, and a sealing ring;
wherein the cylindrical ring resonator, the center mount, the spacer, the plurality of drive and/or sense electrodes, and the sealing ring are formed in a device layer of an SOI wafer.

7. The ring resonator gyro of claim 6, wherein the folded cylinder suspension is formed in a cavity of the device layer of the SOI wafer and a handle layer of the SOI wafer.

8. The ring resonator gyro of claim 5, further comprising:
a spacer, a plurality of drive and/or sense electrodes, and a sealing ring;
wherein the cylindrical ring resonator, the center mount, the spacer, the plurality of drive and/or sense electrodes, and the sealing ring are formed in a handle layer of an SOI wafer.

9. The ring resonator gyro of claim 8, wherein the folded cylinder suspension is formed in a cavity of the handle layer.

10. The ring resonator gyro of claim 5, wherein the folded cylinder suspension is formed through employment of a sacrificial layer deposited in a circular cavity;
wherein a width of the circular cavity is based on a wall thickness of the sacrificial layer and a thickness of the folded cylinder suspension.

* * * * *